United States Patent Office 3,666,326
Patented May 30, 1972

3,666,326
ANTI-SKID DEVICE FOR A VEHICLE
BRAKING SYSTEM
Guy Marouby, Neuilly, France, assignor to Societe
Anonyme D.B.A., Clichy, France
Filed Aug. 5, 1970, Ser. No. 62,240
Claims priority, application France, Sept. 25, 1969,
6932719
Int. Cl. B60t 8/12
U.S. Cl. 303—21 BE
6 Claims

ABSTRACT OF THE DISCLOSURE

An anti-skid device for a vehicle braking system having an electronic sensing unit selectively controlling the operation of an actuating unit formed of two components. Once the braking pressure has been aplied to the braking system, one of the components is selectively activated to isolate the brake pedal from the braking system between one instant corresponding to a predetermined threshold of wheel deceleration and another instant corresponding to the peak value of the wheel acceleration which follows the wheel deceleration while the other component is selectively activated to progressively release the pressure in the braking system to a certain value between said one instant corresponding to said predetermined threshold of wheel deceleration and still another instant corresponding to a second predetermined threshold of wheel deceleration which is closed to the point of zero deceleration (or acceleration), the pressure in the isolated braking system being maintained to the said value until the instant corresponding to the peak value of the wheel acceleration which follows the wheel deceleration. In other words, the pressure is restored in the braking system when the coefficient of friction $\mu$ developed at the interface between the tire and the road reaches a maximum value.

This invention relates to anti-skid devices adapted to co-operate with a vehicle braking system to prevent the wheels from locking in braking and thus to improve the lateral stability of the vehicle while reducing the stopping distance. The invention relates more particularly to an anti-skid device of the kind comprising an electronic sensing unit and an actuating unit, the latter comprising an isolating element and a releasing element.

The sensing unit senses the speed of one of the vehicle wheels and converts the speed into a speed signal proportional to wheel speed, an acceleration signal proportional to wheel deceleration or acceleration, and two control signals associated with particular values of the acceleration signal. One of the two control signals, which is known as the isolating signal, starts when the increase in wheel deceleration passes through a first predetermined deceleration threshold, and ceases when wheel acceleration passes through a predetermined acceleration threshold corresponding substantially to the termination of wheel acceleration subsequent to wheel deceleration. The second control signal, which is called the releasing signal, also starts when wheel deceleration passes through the first predetermined deceleration threshold, and ends when growing wheel deceleration passes through a second predetermined deceleration threshold. The actuating unit of the anti-skid device receives the two control signals produced by the sensing unit, the isolating signal going to the isolating element which, in response to and throughout the isolating signal, isolates the brake pedal from the braking system, while the releasing signal goes to the releasing element which, in response to and throughout the duration of the releasing signal, gradually reduces the pressure in the braking system to a desired value, the pressure in the isolated braking system remaining at such value until the cessation of the isolating signal, i.e., until the brake pedal can be used operatively again and, by decelerating the wheel, produce another operating cycle.

A factor reducing the efficiency of an anti-skid device of the kind described is that both the control signals are always triggered by the same wheel deceleration value, whatever the initial speed of the vehicle may be at the time when the brakes are applied. To obviate this disadvantage, it is known for the level of the first deceleration threshold at which wheel deceleration is compared to be varied in dependence upon the value of the speed signal so that the threshold level is lower in proportion as the initial speed of the vehicle at the time of brake application is lower, with the result that the two control signals start at a lower wheel deceleration. This modification helps to reduce the stopping distance of the vehicle as compared with the stopping distance associated with a fixed deceleration level anti-skid device, but the modified device is still not fully satisfactory in that the isolating signal ceases when wheel acceleration passes through an acceleration threshold corresponding substantially to the termination of wheel acceleration subsequent to wheel deceleration. In other words, the pressure in the braking system can be restored only at the end of the wheel acceleration period.

According to this invention, to obviate this inefficiency and therefore to further reduce the vehicle stopping distance, when wheel acceleration passes through its maximum value, which corresponds to the maximum of the coefficient of friction $\mu$ developed at the interface between the tire and the road, the isolating signal is interrupted so that pressure is restored in the braking system. This is because in order to maintain optimum efficiency, the braking system pressure must be restored when the apex of the cure $\mu = f(G)$ is reached (this curve is familiar to skilled addresses and represents the coefficient of friction $\mu$ at the interface between the tire and the road in dependence upon wheel slip G).

The equilibrium equation for a braked wheel is:

$$C_\mathrm{a}+C_\mathrm{i}+C_\mathrm{f}=0$$

where $C_\mathrm{a}$ denotes the adhesion torque, which depends upon the coefficient of friction $\mu$; $C_\mathrm{i}$ denotes the inertia torque, which depends upon wheel acceleration, and $C_\mathrm{f}$ denotes the braking torque.

Since upon cessation of the releasing signal the pressure in the isolated braking system remains constant, so that the braking torque $C_\mathrm{f}$ is constant too, the equation just given is still satisfied if variations of the adhesion torque $C_\mathrm{a}$ due to variations of the coefficient of friction $\mu$ are compensated for by equal and opposite variations of the inertia torque $C_\mathrm{i}$ and therefore of wheel acceleration. Consequently, when wheel acceleration is maximum, so is the factor $\mu$ and corresponds in this case to optimum wheel slip.

It is therefore an object of this invention to provide an anti-skid device of the kind comprising an electronic sensing unit and an actuating unit comprising an isolating element and a releasing element with provision for interrupting the isolating signal, and therefore helping to restore pressure in the braking system, when wheel acceleration subsequent to wheel deceleration passes through its peak value.

The preferred embodiment of the invention will now be described by way of example with reference to the accompanying drawings, in which.

Figure 1:
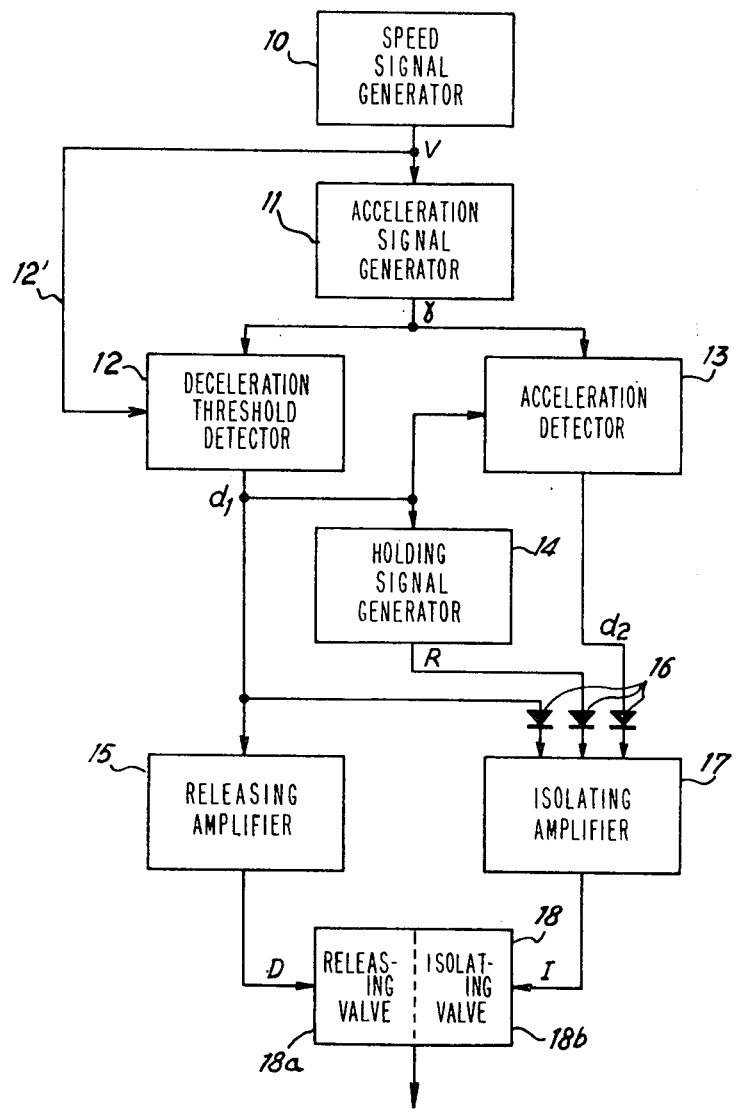
FIG. 1 is a block schematic diagram of an anti-skid device for a wheel including the arrangement according to the invention.

Referring now to FIG. 1, there can be seen an embodiment of an anti-skid device for one wheel, the device comprising a sensing unit and an actuating unit, the sensing unit comprising a speed signal generator 10, a (positive or negative) acceleration signal generator 11, a threshold detector 12 of the deceleration portion $-\gamma$ of the acceleration signal, the arrangement 13 according to the invention which responds only to the acceleration portion $+\gamma$ of the acceleration signal, a holding signal generator 14, a releasing control signal amplifier 15 and an isolating control signal amplifier 17, while the actuating unit 18 comprises a releasing electrovalve 18a and an isolating electro-valve 18b whose output acts on the braking system.

The speed signal generator 10 senses wheel speed and converts it into an electrical signal whose level depends upon wheel speed. Generator 10 can take the form either of a tachometer dynamo providing a signal voltage proportional to wheel speed or of a variable reluctance alternating current type generator providing a signal having a frequency varying directly as the wheel speed and which is converted in a frequency voltage converter into a signal proportional to wheel speed.

The (positive or negative) acceleration signal generator 11 receives the speed signal and differentiates it so as to provide a signal voltage proportional to wheel deceleration or acceleration. Generator 11 comprises e.g. a R-C circuit driving an operational amplifier.

The threshold detector 12 receives the acceleration signal but responds only to the deceleration portion $-\gamma$ thereof. This detector provides a control signal when the deceleration portion $-\gamma$ exceeds a level corresponding to a predetermined wheel deceleration threshold which is in practice, for instance, somewhere between 10 and 80 m./sec./sec. Detector 12 can be embodied by a Schmitt trigger, using an operational amplifier, which is switched from its first stable state to its second stable state when the deceleration portion $-\gamma$ reaches a predetermined level and which is again switched into its first stable state when the deceleration portion $-\gamma$ has returned substantially to its predetermined level. The Schmitt trigger provides a control signal during the time that it remains in its second stable state.

The arrangement 13, which will now be described in detail, receives the acceleration signal but responds only to the acceleration portion $+\gamma$ thereof. This arrangement provides a control signal immediately the acceleration portion $+\gamma$ of the acceleration signal begins and ceases from providing the control signal when the portion $+\gamma$ reaches its peak value. For a purpose which will become apparent hereinafter, the arrangement 13 also receives the control signal provided by threshold detector 12.

For a purpose which will become apparent hereinafter, the holding signal generator 14 serves to produce a pulse having a predetermined constant duration T of e.g. 10 to 20 milliseconds. Generator 14, which can be a monostable multivibrator, receives the control signal provided by threshold detector 12 and responds to the rear edge of such signal, for instance, through the agency of a differentiating circuit and of a clipping means, to be triggered and so to provide the constant-duration pulse that the leading edge thereof coincides in time with the trailing edge of the control signal provided by detector 12.

The control signal provided by detector 12 is amplified in amplifier 15, which can be a conventional D.C. amplifier, and the amplified control signal is applied to the releasing electro-valve 18a of the actuating unit 18 to operate such valve.

The control signal provided by detector 12, the control signal provided by the arrangement 13 and the pulse provided by generator 14 go through routing diodes 16 to amplifier 17, which can also be a conventional D.C. amplifier, and the resulting amplified control signal is applied to operate the isolating electro-valve 18b of the actuating unit 18.

Figure 2:
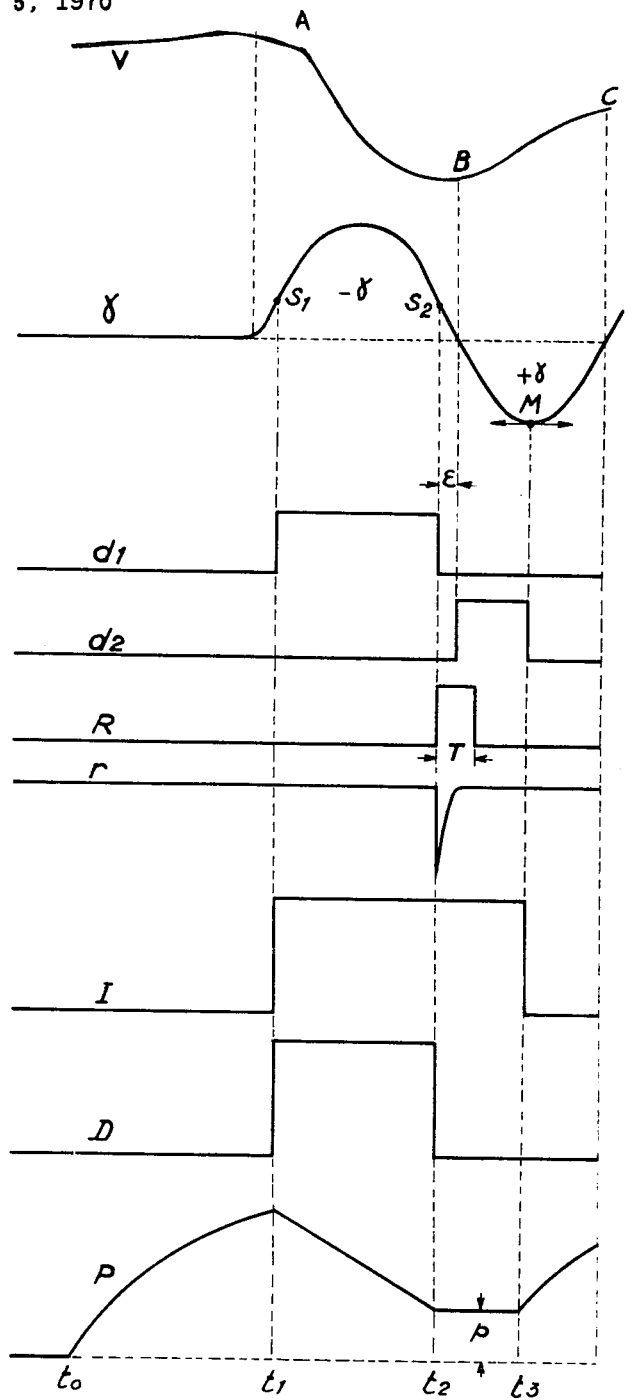
FIG. 2 shows the operating curves of the anti-skid device referred to in FIG. 1.

Reference will now be made to FIG. 2 to explain the operation of the embodiment just described. Curve V represents the speed signal provided by generator 10 and corresponds to the linear speed of the wheel. Curve $\gamma$ represents the acceleration signal provided by generator 11 and corresponds to the linear deceleration $-\gamma$ and then to the linear acceleration $+\gamma$ of the wheel. To simplify practical aspects of circuit construction, the acceleration signal is inverted in relation to wheel acceleration. Curve $d_1$ represents the control signal provided by threshold detector 12. Curve $d_2$ represents the control signal provided by the arrangement 13. Curve R represents the holding pulse provided by generator 14. Curve $r$ represents a negative pulse of use in the operation of the arrangement 13. Curve I represents the resulting amplified control signal which is used to operate the isolating electro-valve 18a and which is provided by amplifier 17. Curve D represents the amplified signal which is used to operate the releasing electro-valve 18b and which is provided by amplifier 15, and curve P represents the pressure acting in the braking system.

The pressure (curve P) acting in the braking system is applied at a time $t_0$. Shortly afterwards, at a point A on curve V, wheel speed starts to decrease. Because of the presence of the anti-skid device, if the pressure produced by the driver in the braking system is excessive, as soon as wheel deceleration reaches a predetermined threshold at a time $t_1$, the $-\gamma$ portion of the acceleration signal reaches the triggering level of the threshold detector 12 (at a point $S_1$ on curve $\gamma$), so that detector 12 is triggered and immediaely produces a control signal (curve $d_1$) which by means of amplifier 17 initiates the operating of the isolating electro-valve 18b (curve I) of the actuating unit 18 so as to isolate the braking system from the brake pedal and which simultaneously by means of amplifier 15 initiates the operating of the releasing electro-valve 18a (curve D) so as to gradually reduce the pressure in the braking system. After wheel deceleration has reached a peak value, wheel speed decreases more slowly and wheel deceleration decreases and passes through a second predetermined threshold substantially equal to the first threshold, while the $-\gamma$ portion of the acceleration signal drops to the value at which it interrupts the threshold detector 12 (at a point $S_2$ on curve $\gamma$), so that the production of the control signal (curve $d_1$) ceases at a time $t_2$, the operation of releasing electro-valve 18a (curve D) is interrupted, and there remains in the braking system a small pressure $p$ which stays constant for as long as the braking system stays isolated. Cessation of the control signal (curve $d_1$) would also interrupt operation of the isolating electro-valve 18b were it not for the fact that at the time $t_2$ the trailing edge of such control signal (curve $d_1$) triggers production of the holding pulse (curve R) which acts via amplifier 17 to maintain isolating electro-valve 18a (curve I) in operation. After a very short time $\epsilon$ the wheel speed stops decreasing at a point B on curve V, then starts to increase up to a peak value at a point C on curve V. Wheel speed increases rapidly during the initial part of portion BC of curve V, reaches a maximum, then increases more slowly for the remainder of the portion BC, and so wheel acceleration first increases, then passes through a peak value, then decreases to zero. When wheel speed starts to increase, the acceleration signal portion $+\gamma$ is applied to the arrangement 13, which responds by providing a control signal (curve $d_2$) which acts via amplifier 17 to keep the isolating electro-valve 18b (curve I) in operation. The function of the holding pulse (curve R) is to keep the isolating electro-valve in operation for the brief period of time $\epsilon$ between the end of the control signal $d_1$ provided by detector 12 and the start of control signal $d_2$ provided by the arrangement 13. For reasons of operating safety, however, the length T of the holding pulse is made slightly longer than ε (e.g. between 10 and 20 milliseconds). When wheel acceleration passes through its peak value, and therefore when the acceleration signal portion $+\gamma$ reaches its peak value M, the control signal (curve $d_2$) provided by the arrangement 13 ceases, the cessation occurring at a time $t_3$. The resulting signal for controlling the isolating electro-valve 18b (curve I) and the operation thereof also cease. The brake pedal can therefore operate the braking system again when the coefficient of friction $\mu$ is substanttally maximum, and if the vehicle driver continues to apply a high pressure in the braking system (as is usually the case), then immediately wheel deceleration passes through the predetermined threshold again (corresponding to the point $S_1$ on curve $\gamma$), the cycle repeats. However, the speed loop ABC is of smaller amplitude and shorter period than in the previous case, and similar considerations apply to the further cycles which ensue until the vehicle stops normally.

The triggering level of the threshold detector 12 can be adjusted manually and, as previously mentioned, can also be adjusted in dependence upon the speed signal which is applied to the threshold detector 12 via line 12'. Also, the anti-skid device can be brought into operation by use of the brake pedal, similarly to the case, for instance, of energising a stop light.

Figure 3:
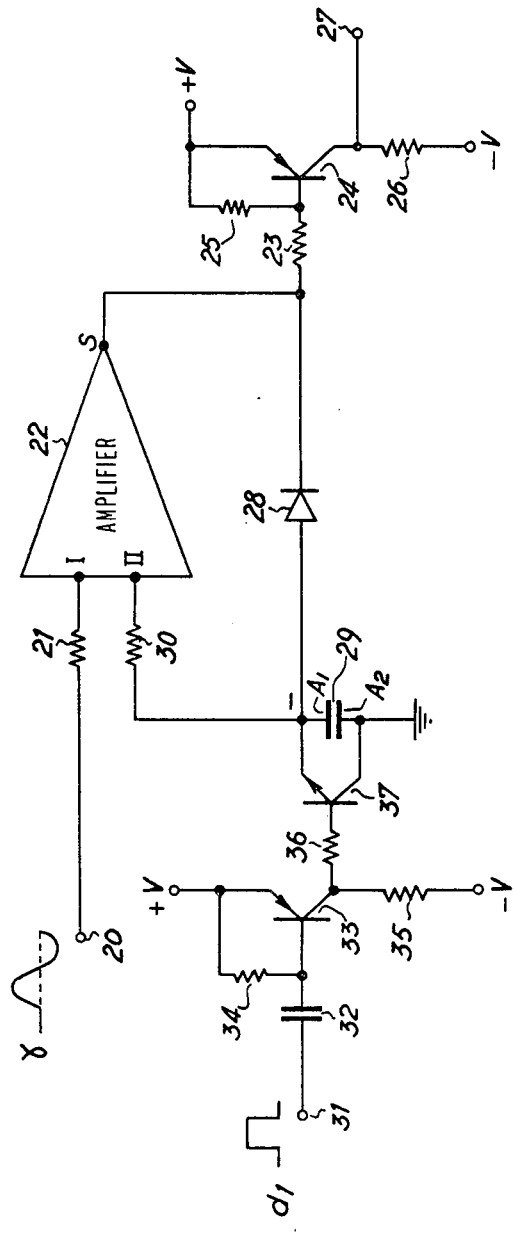
FIG. 3 is a detailed diagram of the arrangement according to the invention.

FIG. 3 shows the arrangement 13 according to the invention which provides the control signal $d_2$ (FIG. 2) immediately the acceleration signal generator 11 produces the acceleration signal portion $+\gamma$, the arrangement 13 ceasing to produce such control signal immediately the portion $+\gamma$ reaches its peak value M. Referring to FIG. 3, an input terminal 20 to which the acceleration signal (curve $\gamma$ of FIG. 2) is applied is connected by a resistor 21 to one input I of an operational amplifier 22 whose output S is connected by a resistor 23 to the base of a PNP-type amplifying transistor 24. The base of transistor 24 is in addition connected by a biasing resistor 25 to a terminal which is brought to a potential +V while the transistor emitter is directly connected to +V and its collector is connected via a load resistor 26 to a terminal brought at a potential −V. An output terminal 27 at which the control signal $d_2$ appears is connected to the junction point between the transistor collector and the load resistor 26. Output S of operational amplifier 22 is also connected, by way of a diode 28 suitably poled, to one side $A_1$ of a storage capacitor 29 whose other side $A_2$ is connected to ground. Side $A_1$ is connected by a resistor 30, which has the same resistance value as resistor 21, to a second input II of amplifier 22. A second input terminal 31 of the arrangement 13 receives the control signal $d_1$ provided by threshold detector 12 and is connected by a capacitor 32 to the base of a PNP-type clipping transistor 33 which is also connected by a resistor 34 to a terminal brought at a potential +V, the capacitor 32 and the resistor 34 forming a R-C differentiating circuit. The emitter of transistor 33 is directly connected to +V and its collector is connected via a load resistor 35 to a terminal brought at a potential −V. The junction point between the collector of transistor 33 and the load resistor 35 is connected via a resistor 36 to the base of an NPN-type discharging transistor 37 whose emitter and collector are connected to the sides $A_1$ and $A_2$ of storage capacitor 29.

In operation and in the absence of acceleration signal at input terminal 20, the potential distribution at the inputs I and II of operational amplifier 22 is such that input I is slightly more positive than input II. Under these conditions, operational amplifier 22 operates at the saturation and output S is brought at the potential +V of its positive supply (not shown), this potential representing the maximum possible level of the signal which the amplifier 22 can provide. Since the potential +V of output S is applied to the base of the PNP amplifying transistor 24, whose emitter is also at the potential +V, transistor 24 remains non-conductive. Also, with the diode 28 connected as shown, this positive potential cannot reach input II of operational amplifier 22. When the acceleration signal portion $-\gamma$, which is positive-going, is applied to input terminal 20, it makes input I more positive but has no effect on output S, since the operation amplifier 22 is already amplifying at saturation and the potential +V appearing at output S represents the maximum signal which amplifier 22 can provide. When the negative-going acceleration signal portion $+\gamma$ is applied to input terminal 20, it makes input I slightly more negative than input II, so that operational amplifier 22 operates at the saturation but with phase inversion and the level of the signal appearing at output S drops immediately to zero. When the acceleration signal portion $+\gamma$ starts to grow in the negative sense, a negative signal appears at output S and is inverted and amplified to saturation in the amplifying transistor 24, which then provides a steep-edged positive signal at its output 27. The negative signal appearing at output S can now go through diode 28, charge up the storage capacitor 29 and be applied to input II. Thereafter the amplifier 22 behaves like a unity gain amplifier and the level of the signal at the output S follows the negative variation of the acceleration signal portion $+\gamma$, whereas the amplifying transistor 24 continues to amplify to saturation and provides the control signal $d_2$ at its output 27. When the portion $+\gamma$ reaches its peak value M, the capacitor 29 is then charged to the peak value M and the input II is brought to the potential of such peak value. When the portion $+\gamma$ starts to decrease in the negative sense from its peak value M, the input I is slightly more positive than the input II and operational amplifier 22 again operates at the saturation without phase inversion and the level of the signal at output S is brought immediately to the potential of its positive supply (not shown) which is the potential +V. Transistor 24 is therefore immediately cut off and ceases to provide control signal $d_2$ at output 27. Since the charge stored by capacitor 29 applies to input II a potential equal to the peak value M of the acceleration signal portion $+\gamma$, and such a potential would prevent the amplifier 22 from operating in a subsequent speed loop, capacitor 29 must be discharged before the next portion $+\gamma$ is applied to the input I. To discharge storage capacitor 29, the trailing edge of the control signal $d_1$ provided by threshold detector 12 during wheel deceleration is used as follows:

Control signal $d_1$ is applied to input terminal 31 and differentiated by the R-C circuit formed by capacitor 32 and resistor 34. The positive differentiation pulse corresponding to the leading edge of control signal $d_1$ has no effect on the clipping transistor 33, the same remaining non-conductive. However, the negative differentiation pulse or zero-resetting pulse, represented by curve $r$ in FIG. 2 and corresponding to the trailing edge of control signal $d_1$, makes transistor 33 operate at the saturation and by the application of a positive pulse taken from its collector transistor 33 renders transistor 37 conductive, the same then acting as a short-circuit across storage capacitor 29 and therefore discharging the same.

The arrangement 13 according to the invention therefore helps to produce a control signal $d_2$ which starts immediately the signal portion $+\gamma$ originates and which terminates when the portion $+\gamma$ reaches its peak value M corresponding to a maximum value of the coefficient of friction $\mu$, so that pressure is restored in the braking system with effect from this privileged time instead of being restored, as in the known anti-skid device, towards the end of the wheel acceleration period following the wheel deceleration period. Although the control signal $d_2$ actually ends approximately 1 millisecond after the signal portion $+\gamma$ has reached its peak value M, the time at which the control signal $d_2$ terminates can be considered to be substantially coincidental with the time at which the portion $+\gamma$ reaches its peak value.

It has been found that a wheel coming up against irregularities in the road surface experiences a brief deceleration followed by a brief acceleration. Consequently, if an anti-skid device is present which, instead of being energised when the brake pedal is operated, is left permanently energised—i.e., is energised as soon as the vehicle is switched on—the acceleration signal generator produces small positive deceleration pulses and small negative acceleration pulses. The small positive deceleration pulses are too small to trigger the threshold detector of the portion $-\gamma$, and so such detector does not provide any control signal $d_1$. On the contrary, if the anti-skid device was to use a threshold detector of the acceleration signal portion $+\gamma$, the small negative acceleration pulses could trigger such a detector, since its threshold level is very low (less than 5 m./sec./sec.), and so accidentally operate the releasing electro-valve 18$b$. Accidental triggering of this kind is made impossible by the arrangement 13 according to the invention. This is because small negative pulses of this kind would not be preceded by any control signal $d_1$ which, if it existed, would discharge the capacitor 29, such pulses would have no effect on the operational amplifier, the same still being controlled by the charge accumulated in capacitor 29 and thus preventing any unwanted output signal appearing at output 27.

The invention has been described and shown with reference to one embodiment, but can be modified and changed in various ways apparent to any skilled addressee without departing from the idea of the invention nor exceeding the scope thereof. For instance, each vehicle wheel can be associated with a control channel comprising the device shown in FIG. 1. However, a compromise may be necessary for reasons of weight, space and cost; for instance, each of the front wheels can be associated with one such control channel while the rear axle is associated with a single control channel.

I claim:

1. An anti-skid device for a vehicle braking system comprising an electronic sensing unit and an actuating unit, the sensing unit including means for sensing the speed of a wheel and producing a speed signal proportional to said speed, means operated by said speed signal to produce an acceleration signal having a deceleration portion and an acceleration portion, means operated by particular values of the acceleration signal deceleration portion to produce a first signal, means operated by the end of said first signal to produce a second fixed-duration signal, and means operated by special values of the acceleration signal acceleration portion to produce a third signal, the actuating unit including an isolating element responding to the combination in time of said first, second and third signals to isolate the brake pedal from the braking system for the duration of the signal resulting from said combination, and a releasing element responding to said first signal to progressively reduce the pressure in the isolated braking system down to a desired valve for the duration of said first signal, characterized in that said means for producing said third signal start to produce the same immediately upon initiation of the acceleration signal acceleration portion and cease to produce said third signal upon the acceleration signal acceleration portion reaching its peak value, thus interrupting operation of said isolating element substantially at the time when wheel acceleration reaches its peak value.

2. An anti-skid device as claimed in claim 1, in which said means for producing said third signal comprises an operational amplifier having two inputs and one output, one input receiving said acceleration signal and the other input being connected to one side of storage means whose other side is connected to a reference potential point, said other input also being connected to said output by a unidirectional conducting device.

3. An anti-skid device as claimed in claim 2, in which said means for producing said third signal comprises an inverting amplifier having its input connected to the output of said operational amplifier, said inverting amplifier responding to only one signal polarity and, when thus responding, operating at the saturation and providing an output signal forming said third signal.

4. An anti-skid device as claimed in claim 2, in which said storage means is formed of a capacitor, and means is provided for discharging said capacitor after the end of the acceleration portion of the acceleration signal.

5. An anti-skid device as claimed in claim 4, in which said discharging means is responsive to the end of said first signal to discharge said storage capacitor.

6. An anti-skid device as claimed in claim 5, in which said discharging means is formed of a circuit whose input receives said first signal and comprising, in the order specified, differentiating means, amplifying means responding to only one signal polarity and, when thus responding, operating at the saturation, and switching means connected across said storage capacitor and forming, when energised by the output signal of said amplifying means, substantially a short-circuit across said storage capacitor.

References Cited

UNITED STATES PATENTS

| | | | |
|---|---|---|---|
| 3,494,671 | 2/1970 | Slavin et al. | 303—21 P |
| 3,532,392 | 10/1970 | Scharlack | 303—21 BE |
| 3,532,393 | 10/1970 | Riordan | 303—21 BE |
| 3,547,501 | 12/1970 | Harned et al. | 303—21 BE |
| 3,556,610 | 1/1971 | Leiber | 303—21 P |
| 3,572,848 | 3/1971 | Marouby | 303—21 BE |

MILTON BUCHLER, Primary Examiner

S. G. KUNIN, Assistant Examiner

U.S. Cl. X.R.

188—181 A; 303—20